3,440,249
ARYL PHENOXATHIINIUM COMPOUNDS
Stanley J. Strycker, Midland, Mich., assignor to The Dow Chemical Company, Midland, Mich., a corporation of Delaware
No Drawing. Filed July 5, 1966, Ser. No. 562,457
Int. Cl. C07d 89/16
U.S. Cl. 260—327          6 Claims

ABSTRACT OF THE DISCLOSURE

Novel 10-hydroxyphenylphenoxathiinium compounds are disclosed. These compounds are prepared by reacting a phenoxathiin oxide with a phenol in the presence of a strong acid. They are useful as antidepressants and as vasoconstrictors.

---

The present invention is directed to an aryl phenoxathiinium compound of the formula

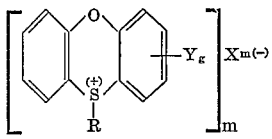

wherein Y represents lower alkyl, trifluoromethyl, halogen, hydroxy, methoxy, acetyl, acetoxy, amino, or acetamido; g represents an integer of from 0 to 1, both inclusive; R represents an ortho-hydroxyphenyl radical of the formula

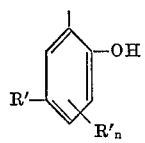

or a para-hydroxyphenyl radical of the formula

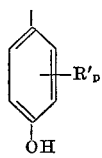

wherein, in said ortho-hydroxyphenyl and para-hydroxyphenyl radicals, each R' independently represents chlorine, bromine, loweralkyl, or loweralkoxy, n represents an integer of from 0 to 1, both inclusive, and p represents an integer of from 0 to 2, both inclusive; X represents a pharmaceutically acceptable anion; and m represents an integer equal to the valence of the pharmaceutically acceptable anion. In the present specification and claims, the terms "loweralkyl" and "loweralkoxy" are employed to designate alkyl and alkoxy, respectively, radicals being of from 1 to 4, both inclusive, carbon atoms, and the term "halogen" is employed to designate appearances of chlorine, bromine, fluorine, and iodine, only. The term "pharmaceutically acceptable anion" is employed herein, in accordance with the manner in which it is used by those skilled in the art, to designate an anion which is pharmaceutically compatible and of low or essentially no toxicity. The choice of the anion is not critical, although a given anion may in some instances exhibit special advantages, due to solubility, ease of crystallization, lack of objectionable taste and the like. Representative pharmaceutically acceptable anion moieties include the following: chloride, bromide, iodide, sulfate, bisulfate, acetate, salicylate, valerate, oleate, phenate, laurate, borate, fluoborate, benzoate, lactate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate, cinnamate, stearate, and the like.

The products of the present invention are crystalline solids or viscous liquid materials. They are prepared by the reaction of a phenoxathiin oxide starting material:

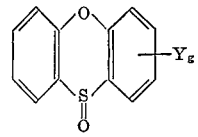

with (1) a phenolic starting material which is of the formula

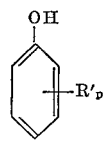

and in which at least one reactive site bears no R' substituent; and (2) a strong acid. Reactive sites on the phenolic starting material include the ring position para to the hydroxy group, or, if the para position bears an R' substituent, the ring positions ortho to the hydroxy group; hence it is necessary that at least one of these three positions bears no R' substituent. The reaction results in the preparation of the desired product of the present invention wherein X represents an anion derived from the acid employed and of water as byproduct. The identity of the acid employed is not critical; typically, sulfuric acid, chlorosulfonic acid, or hydrochloric acid is employed, resulting in product wherein m represents 1 and X represents, in the instance of sulfuric acid and chlorosulfonic acid, —HSO$_4$, or, in the instance of hydrochloric acid, —Cl. Many of the products wherein X and m are of different identity can similarly be prepared by appropriate selection of the acid. However, it is generally preferred to prepare the other products of the present invention in a separate reaction in which the corresponding product wherein X is bisulfate or chloride is reacted with a metal salt having the desired pharmaceutically acceptable anion. This reaction is described in more detail hereinbelow.

The reaction of the phenoxathiin oxide compound, phenolic compound and acid is conveniently carried out in the presence of an inert liquid reaction medium, typically an organic liquid. Representative suitable organic liquids include the chlorinated hydrocarbons, such as chlorobenzene and methylene chloride; alcohols, such as methanol and isopropanol; hydrocarbons, such as benzene, cyclohexane, and hexane; and ethers, such as diethyl ether. The amounts of the reactants employed are not critical, some of the desired product being prepared when employing any amounts. The reaction consumes the reactants in amounts representing equimolecular proportions, and the use of such amounts is preferred. The reaction goes forward under temperatures of a wide range, such as from —30° to 50° C., but is preferably carried out at temperatures from —10° to 10° C.

In carrying out the reaction, the phenoxathiin oxide compound is contacted with the phenolic compound and acid in any convenient manner. However, it is generally preferred to initially contact the phenoxathiin oxide and phenolic compound and thereafter add the acid. The temperautre of the resulting reaction medium can be controlled by regulating the rate of the contacting of the reactants, as well as by external heat exchanging means.

Upon completion of the contacting of the reactants, most of the reaction will have taken place with the production of the desired product. Where optimum yields are desired, it is sometimes preferred that the reaction mixture be allowed to stand for a period of time to insure completion of reaction. Inert liquid reaction medium, when employed, can be removed from the reaction mixture by evaporation under subatmospheric pressure to obtain the desired product as a residue. This product residue can be purified by any of the conventional procedures, such as washing with suitable solvent or recrystallization.

Those products of the present invention which can not, or can not conveniently, be prepared by the reaction set forth foregoing can be prepared, as noted above, by an ion-exchange reaction. In this procedure, any product which can conveniently be prepared in accordance with the foregoing synthesis method, but most typically, the bisulfate or chloride product, is itself reacted with a metal salt having the desired pharmaceutically acceptable anion. Typically, sodium or alkali metal salts are employed, although the identity of the metal is not critical. The reaction is conveniently carried out in an inert liquid reaction medium. Preferably, water is employed as the reaction medium. Although the reaction consumes the reactants in amounts representing stoichiometric proportions, it is preferred to use an excess of the metal salt. Hence, for example, in the instance wherein $m$ in both the starting product and the final product represents 1, it is preferred to use one molecular proportion of starting product and from one to ten molecular proportions of the metal salt compound. The reaction goes forward under temperatures of a wide range, such as from 0° to 100° C., with the production of the product having the desired X anion and a byproduct metal salt in which the anion is the anion of the phenoxathiinium product initially employed.

Typically, the reaction is carried out by adding the phenoxathiinium product to a saturated aqueous solution of a metal salt having the desired anion. The solution is heated to the preferred temperature range, usually prior to addition to the phenoxathiinium product. Upon completion of the addition, most of the reaction will have taken place with the preparation in the reaction mixture of product having the desired anion; however, it is sometimes preferred to permit the reaction mixture to stand for an additional period of time to complete the reaction. The desired product is conveniently separated by cooling the reaction mixture; such cooling results either in the precipitation of the product, which can then be separated by filtration, or the separation of the product as liquid phase, which can then be separated by decantation. Purification if desired, is carried out in conventional procedures, such as recrystallization and washing with suitable solvent.

The following examples illustrate the present invention and will enable those skilled in the art to practice the same.

EXAMPLE 1

10-(p-hydroxyphenyl)phenoxathiinium chloride

Phenoxathiin 10-oxide (10.8 grams; 0.05 mole) and phenol (4.7 grams; 0.05 mole) were added to 250 milliliters of methanol and the resulting solution cooled to a temperature of about 0° C. Thereafter, HCl gas was bubbled into the cooled solution to the point of saturation; the addition was carried out at such a rate that the temperature of the reaction mixture did not rise above 15° C. Following the completion of the HCl addition, the reaction mixture was permitted to stand for a short period of time. The reaction mixture was then subjected to evaporation under subatmospheric pressure to remove methanol and water byproduct and to obtain the desired 10-(p-hydroxyphenyl)-phenoxathiinium chloride product as a liquid residue. This product residue crystallized upon trituration with diethyl ether. The product, after recrystallization from acetonitrile, was found to melt at 217–219° C.

EXAMPLE 2

10-(3-chloro-4-hydroxyphenyl)phenoxathiinium bisulfate

Phenoxathiin 10-oxide (5.4 grams; 0.025 mole), o-chlorophenol (3.2 grams; 0.025 mole), and 50 milliliters of methylene chloride were mixed together, with stirring, and the resulting mixture cooled to a temperature of from —5 to +5° C. Chlorosulfonic acid (2.9 grams; 0.025 mole) was added portionwise over a period of time to the cooled mixture such that the temperature of the reaction mixture remained in the range of from —5 to +5° C. After the completion of the chlorosulfonic acid addition, the reaction mixture separated into two phases; the heavier phase, comprising the desired 10-(3-chloro-4-hydroxyphenyl)phenoxathiinium bisulfate product, was separated by decantation of the lighter phase. The separated product residue was washed with a quantity of ether and crystallized from methyl ethyl ketone. The product thus obtained was found to melt at 206.5–209.0° C., with softening at 169° C.

EXAMPLE 3

10-(p-hydroxyphenyl)phenoxathiinium benzoate

The 10-(p-hydroxyphenyl)phenoxathiinium chloride obtained as reported in Example 1 is added to a quantity of a hot saturated aqueous solution of sodium benzoate. The resulting solution is filtered and then cooled. During the cooling the desired 10-(p-hydroxypheny)phenoxathiinium benzoate product precipitates in the reaction mixture and is separated by filtration. The product has a molecular weight of 414.5.

In view of the foregoing examples and teachings, those skilled in the art will be enabled to prepare all of the products of the present invention. Representative such products include the following: 10-(3,5-dichloro-2-hydroxyphenyl)phenoxathiinium chloride, M.W. of 397.7; 2 - methyl - 10 - (2-bromo-4-hydroxyphenyl)phenoxathiinium chloride, M.W. of 451.8; 2-ethyl-10-(3,5-dimethyl-2-hydroxyphenyl)phenoxathiinium acetate, M.W. of 409; 10 - (5-methyl-2-hydroxyphenyl)phenoxathiinium bisulfate, melting at 221–222° C.; 1-chloro-10-(2,6-dimethyl-4-hydroxyphenyl)phenoxathiinium bisulfate, M.W. of 453; 2 - iodo - 10 - (5-bromo-2-hydroxyphenyl)phenoxathiinium salicylate, M.W. of 635.3; 10-(3-methyl-4-hydroxyphenyl)phenoxathiinium bisulfate, M.P. 127.0–127.5° C.; 2-fluoro-10-(2,5-dimethoxy-4-hydroxyphenyl) phenoxathiinium bromide, M.W. 451.3; 10-(p-hydroxyphenyl)phenoxathiinium bisulfate, M.P. 186.0–187.5° C.; 2 - amino - 10 - (2-bromo-5-ethyl-4-hydroxyphenyl)phenoxathiinium formate, M.W. 484.4; 10-(p-hydroxyphenyl)phenoxathiinium sulfate, M.W. of 682.8; 10-(p-hydroxyphenyl)phenoxathiinium picrate, M.P. 208.5–209.5° C.; 3-acetamido-10-(5-methoxy-2-hydroxyphenyl) phenoxathiinium lactate, M.W. 469.5; 2-acetyl-10-(3-sec-butyl-4-hydroxyphenyl)phenoxathiinium phosphate, M.W. 1269.5; 10-(2-chloro-4-hydroxyphenyl)phenoxathiinium chloride, M.P. 219.0–220.0° C.; 2-hydroxy-10-(5 - n - butoxy - 3 - chloro - 2 - hydroxyphenyl)phenoxathiinium phenylsulfonate, M.W. 605.1; 10-(3-chloro-4-hydroxyphenyl)phenoxathiinium picrate, M.P. 229.0–230.° C.; 2-methoxy-10-(2-n-propoxy-4-hydroxyphenyl) phenoxathiinium chloride, M.W. 417; 2-acetoxy-10-(3,5-dichloro - 4 - hydroxyphenyl)phenoxathiinium acetate, M.W. 479.4; 2-chloro-10-(p-hydroxyphenyl)phenoxathiinium fluoborate, M.P. 198.0–199.5° C.; and 2-(trifluoromethyl)-10-(p-hydroxyphenyl)phenoxathiinium bromide, M.W. 441.3.

The products of the present invention are useful as agents to study and control the behavior of animals, such as mice, rats, and dogs. In this application, the unmodified products can be used; however, it is generally preferred to employ the products in a composition comprising one or more of the products in a pharmaceutically acceptable medium. Each of 2-chloro-10-(p-hydroxyphenyl)phenoxathiinium fluoborate and 10-(2-chloro-4-hydroxyphenyl)phenoxathiinium chloride was separately evaluated in representative operations. The test system comprised the joint use of the anticonvulsant diphenylhydantoin and of reserpine, a known antagonist of diphenylhydantoin; subsequent administration of electroshock was employed as an indicator. The reserpine was administered twenty-four hours prior to shock, and the diphenylhydantoin, thirty minutes prior to shock, the substances being employed in amounts such that the reserpine completely antagonized the diphenylhydantoin and the mice accordingly exhibited electroshock response. Treatment by the compounds of the present invention was carried out by administration one hour prior to shock. Administration of all substances was by intraperitoneal injection. It was found that in this test system, the administration of each of the above-identified products of the present invention protected the mice against the effect of the reserpine antagonism and accordingly prevented electroshock response. In the instance of 10-(2-chloro-4-hydroxyphenyl)phenoxathiinium chloride, a dosage of 44 milligrams per kilogram of individual body weight protected 40 percent of the mice. In the instance of 2 - chloro - 10 - (p-hydroxyphenyl)phenoxathiinium fluoborate, a dosage of 84.5 milligrams per kilogram of individual body weight protected 90 percent of the mice. Accordingly, the products of the present invention can be employed as antidepressants. In other operations, a group of dogs was anesthetized and thereafter challenged with epinephrine to determine degree of blood pressure response thereto. Subsequently, the dogs were pretreated with 10-(p-hydroxyphenyl)phenoxathiinium chloride, at rates of from 1 to 30 milligrams per kilogram of individual animal body weight, and again challenged with epinephrine. In this subsequent study, it was determined that the response to epinephrine was significantly potentiated. Similar results have been obtained with other representative products of the present invention. Accordingly, the compounds of the present invention can also be employed as vasoconstrictors.

The phenoxathiin oxide starting materials to be employed in the preparation of the products of the present invention are prepared in known procedures. In these procedures, the corresponding phenoxathiin compound of the formula:

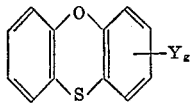

is reacted with hydrogen peroxide. Preferably, the reaction is carried out by dispersing the phenoxathiin compound in glacial acetic acid and thereafter adding a stoichiometric amount of the hydrogen peroxide. The reaction goes forward at temperatures of a wide range but is conveniently and preferably carried out at room temperatures. Following completion of the reaction, the desired phenoxathiin oxide starting material is separated by means of conventional procedures, typically filtration or extraction.

I claim:
1. Compound of the formula

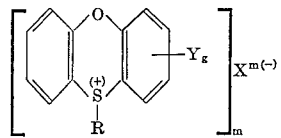

wherein Y represents loweralkyl, trifluoromethyl, halogen, hydroxy, methoxy, acetyl, acetoxy, amino, or acetamido; g represents an integer of from 0 to 1, both inclusive; R represents an ortho-hydroxyphenyl radical of the formula:

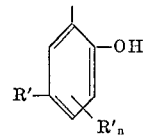

or a para-hydroxyphenyl radical of the formula:

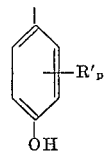

wherein, in said ortho-hydroxyphenyl and para-hydroxyphenyl radicals, each R' independently represents chlorine, bromine, loweralkyl, or loweralkoxy, $n$ represents an integer of from 0 to 1, both inclusive, and $p$ represents an integer of from 0 to 2, both inclusive; X represents a pharmaceutically acceptable anion; and $m$ represents an integer equal to the valance of the pharmaceutically acceptable anion.

2. Compound claimed in claim 1 wherein R' represents (p-hydroxyphenyl).

3. The compound of claim 2 which is 10-(p-hydroxyphenyl)phenoxathiinium bisulfate.

4. The compound of claim 2 which is 10-(p-hydroxyphenyl)phenoxathiinium chloride.

5. The compound of claim 1 in which is 10-(5-methyl-2-hydroxyphenyl)phenoxathiinium bisulfate.

6. The compound of claim 1 which is 10-(2-chloro-4-hydroxyphenyl)phenoxathiinium chloride.

References Cited

UNITED STATES PATENTS 3,299,098    1/1967    Reifschneider _____ 260—327

JAMES A. PATTEN, Primary Examiner.

U.S. Cl. X.R.

260—258, 302, 256, 255, 239.1, 309.5, 999